(12) United States Patent
Mickeleit

(10) Patent No.: US 9,378,217 B2
(45) Date of Patent: Jun. 28, 2016

(54) METHOD AND SYSTEM FOR MANAGING DATA AND A CORRESPONDING COMPUTER PROGRAM AND A CORRESPONDING COMPUTER-READABLE STORAGE MEDIUM

(71) Applicant: Cortado AG, Berlin (DE)

(72) Inventor: Carsten Mickeleit, Berlin (DE)

(73) Assignee: Cortado AG, Berlin (DE)

( * ) Notice: Subject to any disclaimer, the term of this patent is extended or adjusted under 35 U.S.C. 154(b) by 269 days.

(21) Appl. No.: 13/767,579

(22) Filed: Feb. 14, 2013

(65) Prior Publication Data

US 2013/0218855 A1   Aug. 22, 2013

(30) Foreign Application Priority Data

Feb. 16, 2012   (DE) .......................... 10 2012 202 382

(51) Int. Cl.
  *G06F 17/30*   (2006.01)
(52) U.S. Cl.
  CPC ...... *G06F 17/30194* (2013.01); *G06F 17/3012* (2013.01); *G06F 17/30091* (2013.01); *G06F 17/30203* (2013.01)
(58) Field of Classification Search
  CPC .................... G06F 17/30194; G06F 17/30091; G06F 17/30312
  See application file for complete search history.

(56) References Cited

U.S. PATENT DOCUMENTS

| | | | |
|---|---|---|---|
| 7,934,251 B2* | 4/2011 | Hesselink et al. ............... | 726/11 |
| 8,812,849 B1* | 8/2014 | Ubl .............................. | 713/172 |
| 2003/0188180 A1* | 10/2003 | Overney ............... | H04L 9/0869 713/193 |
| 2005/0192966 A1 | 9/2005 | Hilbert et al. | |
| 2006/0161627 A1* | 7/2006 | Bradbury ................. | H04L 51/22 709/206 |
| 2007/0260701 A1* | 11/2007 | Thomason ..................... | 709/217 |
| 2008/0214300 A1* | 9/2008 | Williams .............. | G06F 21/125 463/29 |
| 2009/0144300 A1* | 6/2009 | Chatley et al. ................ | 707/100 |
| 2009/0282046 A1 | 11/2009 | Isaacson et al. | |
| 2010/0179984 A1* | 7/2010 | Sebastian ...................... | 709/203 |

(Continued)

FOREIGN PATENT DOCUMENTS

| | | |
|---|---|---|
| WO | WO 98/24025 | 6/1998 |
| WO | WO 01/33829 | 5/2001 |
| WO | WO 02/75539 | 9/2002 |

OTHER PUBLICATIONS

Request for Examination Dated Nov. 5, 2012 From Deutsches Patent- und Markenamt (German Patent and Trademark Office) Re. Application No. 102012202382.8 and Its Translation Into English.

(Continued)

*Primary Examiner* — Bruce Moser

(57) ABSTRACT

The invention relates to a method and a system for managing data and a corresponding computer program and a corresponding computer-readable storage medium, which can be used, in particular, to simplify the data management on a remote storage system when accessing the storage system from a terminal. For this purpose, a method for managing data is proposed, wherein the data on a remote storage device are managed from a terminal, and wherein by an application installed on the terminal, when the data stored at a storage location on the remote storage device are accessed by the terminal, at least an identifier of the data and information about the storage location of the data are stored by the application and made available to a user when storing the optionally modified data, particularly when writing back the optionally modified data on the remote storage.

13 Claims, 2 Drawing Sheets

(56) References Cited

U.S. PATENT DOCUMENTS

2011/0040943 A1* 2/2011 Kondo et al. ............... 711/162
2011/0055177 A1 3/2011 Chakra et al.

OTHER PUBLICATIONS

Escobar Garcia "Software Development and Collaboration: Version Control Systems and Other Approaches", Technische Universitaet Berlin, 10 P., May 2011.

Sivathanu et al. "Ensuring Data Integrity in Storage: Techniques and Applications", Proceedings of the 2005 ACM Workshop on Storage Security and Survivability, StorageSS '05, Fairfax, Virginia, USA, Nov. 11, 2005, p. 26-36, Nov. 11, 2005.
Swierk et al. "The Roma Personal Metadata Service", Mobile Networks and Applications, 7(5): 407-418, 2002.
Office Action Dated Aug. 12, 2015 From the Israel Patent Office Re. Application No. 224733.
Translation Dated Aug. 30, 2015 of Office Action Dated Aug. 12, 2015 From the Israel Patent Office Re. Application No. 224733.

\* cited by examiner

METHOD AND SYSTEM FOR MANAGING DATA AND A CORRESPONDING COMPUTER PROGRAM AND A CORRESPONDING COMPUTER-READABLE STORAGE MEDIUM

RELATED APPLICATION

This application claims the benefit of priority of German Patent Application No. 102012202382.8 filed on Feb. 16, 2012, the contents of which are incorporated herein by reference in their entirety.

FIELD AND BACKGROUND OF THE INVENTION

The invention relates to a method and a system for managing data and a corresponding computer program and a corresponding computer-readable storage medium, which are used, in particular, to simplify the data management on a remotely located storage system when accessing the storage system from a terminal.

When a user wants to change data stored on a remote data storage device, in particular a mass storage device, the user cannot work with the original, but must create a copy of the data which must then be stored on a local terminal for processing. Different techniques used on the data storage devices require different handling during use. A module performing the access and adapted to each external data storage device must be present and configured on the local terminal on which the data are to be processed. These modules are traditionally designed only for transfer of data and moreover lack administrative or logging functionality. The user himself is therefore responsible for:

monitoring the versions, the location of the data on the external data storage device in the proper directory, and selecting the correct data storage device.

For example, when a file name was allocated several times to different files stored in different directories on different data storage devices, the user encounters significant problems in writing back these files to the desired location on the remote data storage device after a change, because information about the source location is no longer available after copying to the local drive. This complexity could hitherto only be overcome manually.

When using conventional solutions for data management, access to data stored on a remote data storage device is thus cumbersome in comparison with the use of locally stored data. Various techniques are used to access the remote data storage device, depending on the type of the remote data storage device. A user must be familiar with all these different techniques to be able to use the data storage device. In addition, data management is extremely error-prone when using the conventional techniques.

In the state of the art, revision systems are offered for data management. These systems focus on tracking and logging changes in the stored data, e.g. to go back to an older version. Such revision systems require an additional module installed on the data storage devices. This significantly limits the function of the (universal) data storage device, because even simple read accesses must be performed by this process. In addition, these revision systems require a strict retention of directories on the mass storage device and on the local terminal. This information is specified during configuration of the revision control system. The control of the revision control system and hence of the information about the storage location ceases when the data were copied or moved to a new location on the local terminal.

SUMMARY OF THE INVENTION

It is therefore the object of the invention to provide a method and a system for managing data and a corresponding computer program and a corresponding computer-readable storage medium, which eliminate the disadvantages of the conventional solutions and, more particularly, simplify readout of data from remote data storage devices, processing these data and/or storing data, optionally processed data, at the original storage location on the remote data storage device.

This object is attained with the invention by the features in claims 1 and 11 to 13. Advantageous embodiments of the invention are recited in the dependent claims.

Advantageously, with the method of the invention, handling of data, such as files that are stored on a remote storage system and accessed from a terminal, can be significantly simplified for users of the terminal. This is achieved by providing with the method for managing data a program module, which is installed on a terminal from which remotely stored data are accessed. This module supports the management of remotely stored data. When a user accesses from of a terminal data stored on the remotely located storage system, the program module stores metadata about the accessed data. In particular, the program module stores the metadata when the data are downloaded from the storage system to and stored on the terminal. The metadata may include, for example, at least one of the following information: an identifier of the storage system on which the data are stored, the directory in the storage system on which the data are stored, an identifier of the data, time stamps (the time of day and/or the date) when the data were produced, stored and/or accessed, and the like. In a preferred embodiment, a checksum over the data may be formed, for example, in order to determine whether the data were changed when the data are written back to the storage system. The metadata may preferably be determined when the data are downloaded to the terminal by the terminal, by the storage system and/or by a third data processing device and stored on the terminal.

According to the invention, at least a part of the metadata stored by the program module may be used when storing or writing back the optionally modified data that were loaded from the storage system to the terminal. In particular, the program module may automatically access the directory in the storage system on which the data were stored. The modified data may be written back to the directory automatically or a menu such as a file manager may be offered to the user. The user can with the menu select a directory on the storage system, into which he may want to write the modified data. Preferably, the directory on the storage system on which the data were stored when the user downloaded the data to the terminal is first offered by the menu to the user by default. According to a preferred embodiment, after inputting a command for storing data that were loaded from the storage system to terminal, the connection to the storage system, on which the data were stored, is automatically established by the program module. For this purpose, the program module accesses communication protocols, such as ftp (File Transfer Protocol), http (Hypertext Transfer Protocol), scp (Secure Copy), rsync (Remote Synchronization), and the protocols used in the revision control systems, and the like. The program module provides these communication protocols with the necessary information to establish the connection between the terminal and the storage system, in particular at least a portion of the stored metadata. Preferably, at least the identifier of the data and/or the information about the location of the data, i.e. information about the directory in the storage system on which the data were stored, are provided. Preferably, the program module is linked with document processing applications, e.g. Microsoft Word®, Excel®, and Adobe® Acrobat®. Advantageously, the program module may be integrated in the storage function of the application, so that the program module is invoked when using the storage function, for example, when using a storage button.

According to a preferred embodiment, the metadata remains linked to the data, which are downloaded to the terminal, irrespective of whether the data have been amended or whether the data have been moved from a first to a second storage location, for example from a first to a second directory, or whether the data have been amended and moved. This means, even if the data have been changed or moved, after a user has put in a command for storing the data, the user is offered as target location for storing the storage location on the remote storage system, from which the data were downloaded. Alternatively, the data may be stored by the program module automatically (without enquiry from the program module) on the storage location on the remote storage system, from which the data were downloaded.

According to a preferred embodiment, the checksum may be formed over the data to be written back and made available to the program module. This checksum is used to determine whether the data have changed or not. This comparison (as well as the formation of checksums) may be performed on the terminal by a module installed on the remote storage system or by a third data processing device. Performing the comparison on the terminal has the advantage that no special software needs to be installed on the storage system. Performing the comparison on the remote storage system has the advantage that it can be determined whether the data stored on the remote storage system were accessed by a third party and/or whether the data stored on the remote storage system were changed by a first user or by a second user after downloading and before being written back. When it is discovered during the comparison of the checksums that the checksums do not match, the user is notified. In a preferred embodiment, the program module may offer to the user an option to decide whether the existing data on the storage system should be overwritten or whether the name of the data to be written back should be changed. According to a preferred embodiment, the written-back data are automatically stored under a new identifier, either as a general rule or when data with the same identifier already exist in the directory on the storage system. This new identifier may be, for example, the original identifier, which is augmented by other features such as a user code, information about the time of the restoration and/or a serial number. In another preferred embodiment, the options for the user to overwrite data or to save new data may be limited. The aforedescribed process of checking and storing the modified data may also be performed with other metadata, such as the file name, the date and time of the change.

According to another preferred embodiment, the data accessed most recently by the user (favorites) may be displayed to the user on optical output devices of the local terminal, e.g. in the form of a menu on a display, when accessing the remote storage system. This feature facilitates, for example, the retrieval of data when accessing the remote storage system, because it is independent of the directory structure on the remote storage system.

In a preferred embodiment, when downloading data from the remote storage system to the terminal, the user may be informed by the program module whether data having the same identifier as the new downloaded data already exist locally on the terminal. Preferably, the user is offered by way of a menu the option to change the identifier of the data to be downloaded during the local storage operation. The change can be implemented with an extension of the original identifier. This prevents a loss of data caused by overwriting already locally existing data. According to another preferred embodiment, when writing back the data to the storage system, the change of the identifier is preferably undone automatically by the program module. The user is then advised when reading data from a first storage system to the terminal, whether data having the same identifier as the data to be downloaded are already stored on the terminal. According to a preferred embodiment, the identifier of the downloaded data is automatically augmented with information referring to the location on the remote storage system. This prevents the data with the same identifier, but originating from different remote storage systems, to be mixed up and mistakenly overwritten. Accordingly, uniquely identified data are always stored on the terminal. A notification regarding data having the same identifier as the data to be downloaded can be issued regardless of whether the existing data are in the local directory where the downloaded data are to be stored.

In another preferred embodiment of the invention, the metadata may be stored so that they can be accessed by the program module from different terminals, wherein the program module is installed on the respective terminals. When data are to be stored by such terminal having an installed program module, in particular to be written back to the remote storage system, the program module accesses, preferably automatically, the metadata in order to determine whether the data to be stored are data that were previously downloaded from a remote storage system. This approach is particularly useful when data were downloaded from the remote storage system by a first terminal, thereafter transmitted from the first terminal to a second terminal, and subsequently written back to the remote storage system from the second terminal, optionally after having been processed. The data are therefore always checked to determine whether the data were downloaded from a remote storage system at an earlier time, regardless of whether the data were downloaded from the remote storage system by the terminal storing the data. In this embodiment, the metadata are preferably stored on a third data processing device which is different from the first and second terminal and the remote storage system and which can be accessed by the program module installed on the first and second terminal.

A system according to the invention includes at least one chip and/or processor, and is configured to execute a method for managing data, wherein a terminal interacts with at least one remote storage device, and wherein the data on the at least one remote storage device are managed from the terminal. At least one identifier of the data and information about the storage location of the data are stored using an application installed on the terminal when the terminal accesses data stored at a storage location on the remote storage device, and made available to a user when the optionally modified data are stored, in particular when the optionally modified data are stored on the remote storage device.

A computer program for managing data allows a data processing device, which includes at least one terminal and at least one storage device remote from the at least one terminal, after the computer program has been loaded into a storage device of the data processing device, in particular into a storage device of the at least one terminal, to perform a data management method, wherein the data are managed from a terminal on a remote storage device, wherein at least one identifier of the data and information about the storage location of the data are stored by an application installed on the terminal, when accessing from the terminal data that are stored at a location on the remote storage device, and made available to a user when the optionally modified data are stored, in particular when the optionally modified data are written back to the remote storage device.

In another preferred embodiment of the invention, the computer program according to the invention may be modular, wherein individual modules may be installed on different parts of the data processing device.

Advantageous embodiments furthermore contemplate computer programs configured to execute other process steps or procedures specified in the description.

Such computer programs can be provided, for example, (fee-based or free of charge, freely accessible or password-protected) for downloading in a data or communication network. The provided computer programs may also be used with a process wherein a computer program according to claim 12 is downloaded from an electronic data network, for example from the Internet, to a data processing system connected to the data network.

For carrying out the inventive method for managing data, a computer-readable storage medium may be employed on which a program is stored which allows a data processing device, after the program has been loaded into a storage device of the data processing device, to execute a data management method, wherein the data are managed on a remote storage device from a terminal, wherein at least one identifier of the data and information about the storage location of the data are stored by an application installed on the terminal, when accessing from the terminal data that are stored at a location on the remote storage device, and made available to a user when the optionally modified data are stored, in particular when the optionally modified data are written back to the remote storage device.

In particular, the present invention offers the following advantages:

The user interacts only with a program module for communication with one or more remote data storage devices and is no longer required to deal with different access mechanisms.

The user is immediately notified of file changes when storing data.

The user is no longer required to select the correct data storage device and the correct directory locally and/or on the remote storage system, by checking the file versions and copying the data to the data storage device, optionally even renaming the file beforehand. Revision control is performed automatically.

When an external data storage device is used by multiple users, control over the various versions can be maintained in spite of the presence of various copies on the local devices of the different users.

The user is informed when reading out again the data from the data storage device that a copy has already been stored. It can also be detected from the metadata whether the locally stored data have already been changed. (This is also the case when the data were changed on the data storage device after the user created a local copy, which can be immediately recognized from the metadata based on the time stamp).

While conventional remote data storage devices are accessed via protocols such as ftp, http, scp, rsync, and the like, the inventive program module is superimposed on these communication protocols, thereby expanding their functionality. Accordingly, the invention provides functions that are not offered by these communication protocols alone.

BRIEF DESCRIPTION OF THE DRAWINGS

An exemplary embodiment of the invention will now be described in more detail with reference to the figures of the drawings, which show in.

DESCRIPTION OF SPECIFIC EMBODIMENTS OF THE INVENTION

Figure 1:
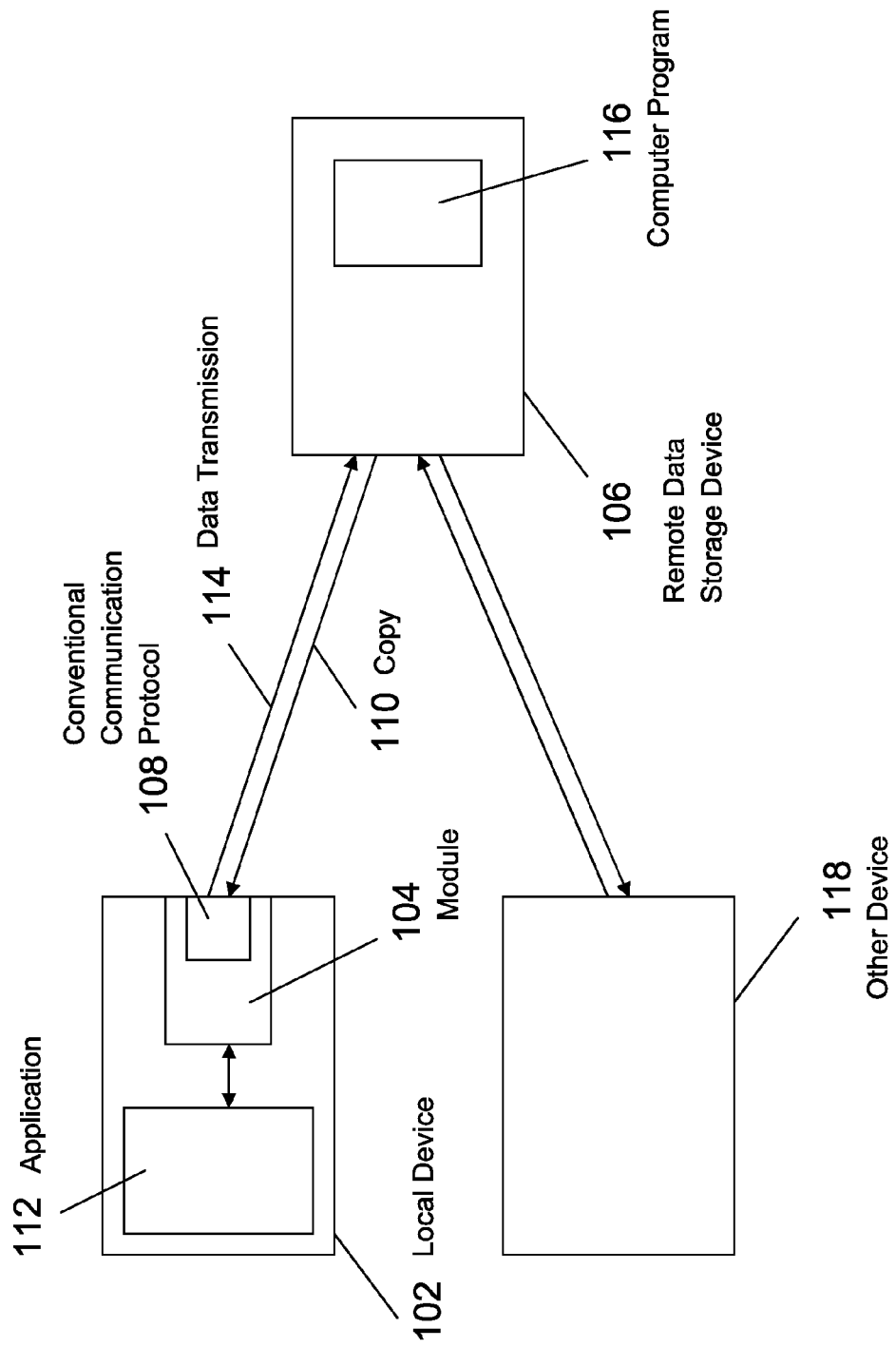
FIG. 1 a schematic diagram of an exemplary architecture for executing the data management method according to the present invention, and FIG. 2 a diagram of an alternative exemplary embodiment of the present invention.
Figure 2:
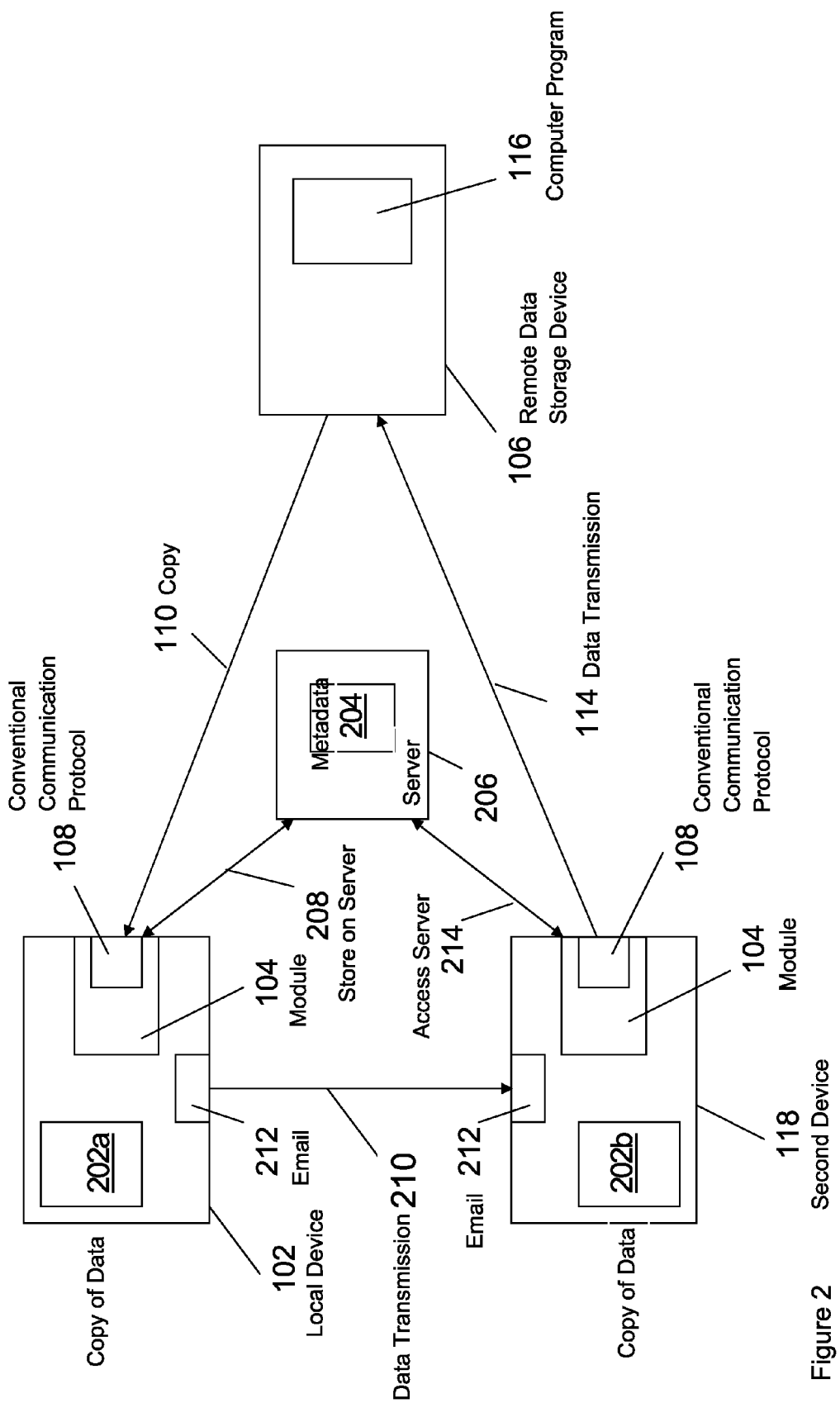

In the exemplary embodiment, a module 104 which connects to one or more external remote data storage devices 106 is installed on a local device 102. While the exemplary embodiment is described only with respect to a single exemplary remote data storage device 106, the invention also encompasses embodiments where several remote data storage devices 106 are accessed by the local device 102. This module 104 serves as a user interface to the at least one external remote data storage device 106. In particular, it presents to the user the files stored on the remote data storage device 106, for example via an optical interface, for example on a display of the local device 102. The user preferably exchanges files with the remote data storage device 106 only via this module 104, wherein the module 104 accesses conventional communications protocols 108, such as ftp, http, scp, rsync and the like, for the actual transmission of the files.

When the user copies a file from the remote data storage device 106 to the local device 102 using the module 104 (copying is illustrated herein by the reference numeral 110), additional information, in particular metadata that more closely describe the access and/or the file, is stored by the module 104. Preferably, the additional information includes at least a reference to the remote data storage device 106, the directory on the remote data storage device 106 on which the file is saved, a time stamp (date, time, and the like.) of the access. In the exemplary embodiment, a first checksum over the file stored on the remote data storage device 106 is formed in parallel. This first checksum is also stored. To process the file, an application 112 commensurate with the file format is launched on the local device 102. After the file has been processed by the user, the file is to be stored again on the remote data storage device 106. For this purpose, the file is transmitted to the module 104. According to the exemplary embodiment, the module 104 is invoked by activating a storage functionality of the application 112. At least a portion of the metadata is determined with the module and a second checksum is formed over the file to be stored. The remote data storage device 106 and the original directory on the remote data storage device 106, from which the file was downloaded, are determined from these metadata. The actual transmission 114 of the file from the local device 102 to the remote data storage device 106 is performed using the conventional communication protocols 108. These communication protocols 108 are invoked by the module 104. The second checksum is compared with the first checksum formed during downloading. When these checksums differ from one another, the user is notified. He can then decide whether the file on the remote data storage device 106 should be overwritten, whether a new file with a different name should be created or whether the file should be stored in a different directory (with a changed or unchanged name).

In another exemplary embodiment, a computer program 116 is stored on the remote data storage device 106, which controls the use of files by multiple users accessing the files stored on the remote data storage device 106 from the local device 102 or from another device 118. In particular, the computer program 116 performs a revision control. For example, the computer program 116 may check, in particular when a file has been written back by a first user, whether the (original) file remaining on the remote data storage device 106 was modified by a second user after having been downloaded by the first user. When such intermediate change is discovered, the user is notified accordingly. The user then has all the abovementioned options for storing the file to be written back, for example overwriting the existing file, creating a new file with a different name or saving the file in a different directory (with a changed or unchanged name).

The invention will be illustrated based on another embodiment for the case where data from the remote data storage device 106 are downloaded to a first local device 102 (reference numeral 110) and then transmitted from the first local device 102 to a second device 118.

In this embodiment, the metadata 204 are determined as in the aforedescribed embodiments. The metadata 204 may be stored on an additional data processing device, for example on a server 206. The server 206 may be a stand-alone device or may be installed, for example, on the remote data storage 106. In each case, the server 206 can be contacted by the module 104 installed on the first 102 and the second 118 device for accessing the metadata 204 stored thereon.

Specifically, the following steps are performed: When downloading 110 data from the remote data storage device 106 to the first local device 102, the metadata associated with the data are determined by the module 104 as described above, and stored on a server 206 (reference numeral 208). After this step, a copy 202a of the data is stored on the first local device 102. Subsequently, the data or a copy of the data can be transmitted from the first local device 102 to the second device 118 (reference numeral 210), for example with an e-mail application 212. A copy 202b of the data, which may optionally be processed, is stored on the second device 118. When the data or the copy 202b are to be stored again, for example to be written back to the remote data storage 106, as described above in conjunction with the alternative embodiments, the metadata associated with the optionally modified data are determined, and preferably a checksum over the optionally modified data is formed. Thereafter, the module 104 installed on the second device 118 accesses the server 206 (reference numeral 214), in order to determine the metadata 204 associated with the data and stored on the server 206 and to compare them with the newly determined metadata and the checksum on the second device 118. When the module 104 has determined comparable metadata on the server 206, it notifies the user of the second device 118 thereof, offers the user for example a menu with a directory structure such as a file manager for the storage operation, and optionally notifies the user that the target directory already contains a file with the same name. Preferably, the original directory from which the data were downloaded is displayed to the user in the menu. In conjunction with the information about already existing data, the user is offered a choice, preferably automatically, for deciding whether the existing data should be overwritten or whether the data to be written back should be stored under a new name. The data are then written back (reference numeral 114).

The embodiment of the invention is not limited to the above-mentioned preferred embodiments. Rather, a number of modifications can be envisioned, which makes use of the method and the device of the invention even with fundamentally different designs.

What is claimed is:

1. A method for managing data on a remote storage device from a terminal, comprising:
   storing with a first application installed on the terminal, when accessing with the terminal data stored at a storage location on the remote storage device, at least one of:
   an identifier of the data, and
   information about the storage location of the data on the remote storage device, and the first application, in response to a command for storing the data entered by the user in the terminal,
   offering to store the data at the storage location on the remote storage device defined by the at least one of said identifier and said information, or automatically storing the data at the storage location on the remote storage device defined by the at least one of said identifier and said information;
   wherein the method further comprises
   forming a first checksum of the data when downloading the data from the remote storage device to the terminal,
   forming a second checksum when writing the data back to the remote storage device,
   comparing the first checksum and the second checksum,
   when the checksums differ from one another, performing at least one of the following actions:
   notifying the user of the conflicting checksums, and storing the data with a different identifier,
   downloading the data from the remote storage device to a first storage location on the terminal,
   subsequently moving the downloaded data to a second storage location, and in response to a command for storing the moved data, the first application offering to the user to store the moved data at the storage location on the remote storage device defined by the at least one of said identifier and said information, or the first application automatically storing the moved data at the storage location on the remote storage device defined by the at least one of said identifier and said information.

2. The method of claim 1, wherein the data are modified before the command for storing the data is entered.

3. The method of claim 1, wherein the moved data are modified before the command for storing the moved data is entered.

4. The method of claim 1, wherein the data are modified before writing back.

5. The method of claim 1, wherein at least the identifier of the data or the information about the storage location of the data, or both, are determined by at least one of the following units:
   the terminal,
   the remote storage device, and
   a third data processing device.

6. The method of claim 1, wherein a second application controlling access to the remote storage device by multiple users is installed on the remote storage device.

7. The method of claim 6, wherein a first user is notified when data have been modified by a second user.

8. The method of claim 1, further comprising:
   storing on the terminal and on a data processing device that is different from the terminal at least the identifier of the data that are determined when the data are accessed by the terminal and stored at a storage location on the remote storage device and the information about the storage location of the data.

9. The method of claim 8, wherein
the at least one of said identifier and said information is made available to at least one second terminal for storing the data.

10. The method of claim 1, wherein the application is superimposed on communication protocols designed for data exchange with the remote storage device.

11. A system comprising at least a chip or a processor, wherein the system is configured to execute a method for managing data on a remote storage device from a terminal by:
storing with a first application installed on the terminal when accessing with the terminal data stored at a storage location on the remote storage device at least one of:
an identifier of the data, and
information about the storage location of the data on the remote storage device,
offering with the first application, in response to a command entered by the user in the terminal for storing the data, to store the data at the storage location on the remote storage device defined by the at least one of said identifier and said information, or automatically storing the data at the storage location on the remote storage device defined by the at least one of said identifier and said information,
forming a first checksum of the data when downloading the data from the remote storage device to the terminal,
forming a second checksum when writing the data back to the remote storage device,
comparing the first checksum and the second checksum, and
when the checksums differ from one another, performing at least one of the following actions:
notifying the user of the conflicting checksums,
storing the data with a different identifier
downloading the data from the remote storage device to a first storage location on the terminal, and
subsequently moving the downloaded data to a second storage location, and in response to a command for storing the moved data, the first application offering to the user to store the moved data at the storage location on the remote storage device defined by the at least one of said identifier and said information, or the first application automatically storing the moved data at the storage location on the remote storage device defined by the at least one of said identifier and said information.

12. A computer program product comprising:
a non-transitory computer readable storage medium having stored thereon:
computer program instructions executable by a data processing device to cause said data processing device, after the computer program instructions has been loaded into a storage device of the data processing device, to execute a method for managing data on a remote storage device from a terminal by:
storing with a first application installed on the terminal when accessing with the terminal data stored at a storage location on the remote storage device at least one of:
an identifier of the data, and
information about the storage location of the data on the remote storage device, offering with the first application, in response to a command entered by the user in the terminal for storing the data, to store the data at the storage location on the remote storage device defined by the at least one of said identifier and said information, or automatically storing the data at the storage location on the remote storage device defined by the at least one of said identifier and said information,
forming a first checksum of the data when downloading the data from the remote storage device to the terminal,
forming a second checksum when writing the data back to the remote storage device,
comparing the first checksum and the second checksum, and
when the checksums differ from one another, performing at least one of the following actions:
notifying the user of the conflicting checksums,
storing the data with a different identifier,
downloading the data from the remote storage device to a first storage location on the terminal, and
subsequently moving the downloaded data to a second storage location, and in response to a command for storing the moved data, the first application offering to the user to store the moved data at the storage location on the remote storage device defined by the at least one of said identifier and said information, or the first application automatically storing the moved data at the storage location on the remote storage device defined by the at least one of said identifier and said information.

13. A non-transitory computer-readable storage medium on which a program is stored, which causes a data processing device, after the program has been loaded into a storage device of the data processing device, to execute a method for managing data on a remote storage device from a terminal by:
storing with a first application installed on the terminal when accessing with the terminal data stored at a storage location on the remote storage device at least one of:
an identifier of the data, and
information about the storage location of the data on the remote storage device,
offering with the first application, in response to a command entered by the user in the terminal for storing the data, to store the data at the storage location on the remote storage device defined the by at least one of said identifier and said information, or automatically storing the data at the storage location on the remote storage device defined the by at least one of said identifier and said information,
forming a first checksum of the data when downloading the data from the remote storage device to the terminal,
forming a second checksum when writing the data back to the remote storage device,
comparing the first checksum and the second checksum, and
when the checksums differ from one another, performing at least one of the following actions:
notifying the user of the conflicting checksums,
storing the data with a different identifier,
downloading the data from the remote storage device to a first storage location on the terminal, and
subsequently moving the downloaded data to a second storage location, and in response to a command for storing the moved data, the first application offering to the user to store the moved data at the storage location on the remote storage device defined by the at least one of said identifier and said information, or the first application automatically storing the moved data at the storage location on the remote storage device defined by the at least one of said identifier and said information.

* * * * *